United States Patent
Fujiwara

(10) Patent No.: US 8,577,148 B2
(45) Date of Patent: Nov. 5, 2013

(54) IMAGE COMBINING APPARATUS AND IMAGE COMBINING PROGRAM

(75) Inventor: Yoko Fujiwara, Kawasaki (JP)

(73) Assignee: Konica Minolta Business Technologies, Inc. (JP)

( * ) Notice: Subject to any disclaimer, the term of this patent is extended or adjusted under 35 U.S.C. 154(b) by 124 days.

(21) Appl. No.: 13/283,484

(22) Filed: Oct. 27, 2011

(65) Prior Publication Data

US 2012/0114244 A1    May 10, 2012

(30) Foreign Application Priority Data

Nov. 10, 2010 (JP) .................... 2010-251998

(51) Int. Cl.
*G06K 9/18* (2006.01)
(52) U.S. Cl.
USPC ......................................... 382/186
(58) Field of Classification Search
None
See application file for complete search history.

(56) References Cited

U.S. PATENT DOCUMENTS

2006/0291000 A1* 12/2006 Maeda et al. ................. 358/452
2008/0309993 A1* 12/2008 McKinley et al. ............ 358/474

FOREIGN PATENT DOCUMENTS

JP    2006-163952    6/2006

* cited by examiner

*Primary Examiner* — Nirav G Patel
(74) *Attorney, Agent, or Firm* — Squire Sanders (US) LLP

(57) ABSTRACT

An image combining apparatus includes a control section which acquires first position information identifying a figure on a first medium from an electronic pen by using the first medium where a pattern for the electronic pen to detect an electronic pen tip position is combined with a background of a image list, identifies an image from the position information by referring to information associating each image with a position on the first medium, further acquires second position information identifying a figure on a second medium from the electronic pen by using the second medium on which the pattern is formed, and identifies an image combining area from the first and second position information, and then associates the image combining area with the image; and an image processing section creating a combined image by combining the image combining area with the image associated with the image combining area.

14 Claims, 18 Drawing Sheets

ANOTO (REGISTERED MARK) PATTERN

FIG. 9
FIRST INSTRUCTION METHOD
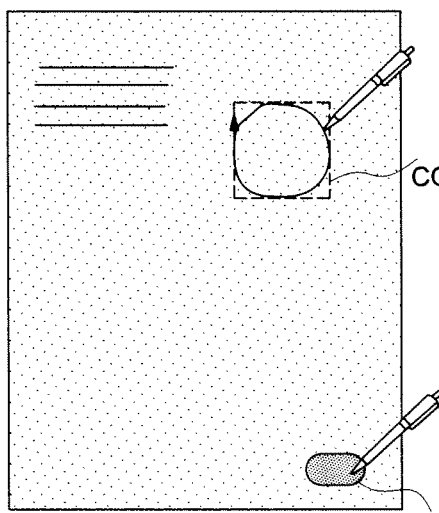
IMAGE COMBINING AREA
COMMAND BUTTON
SECOND INSTRUCTION METHOD
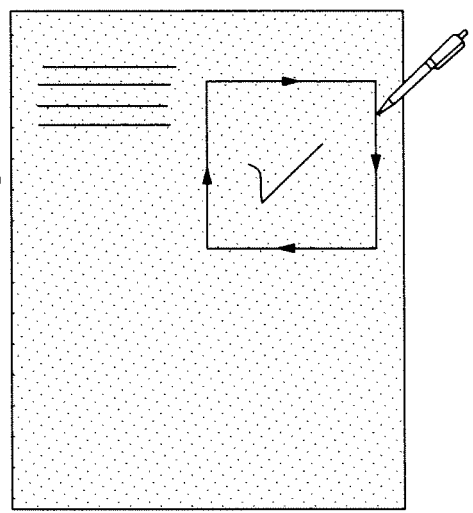
THIRD INSTRUCTION METHOD
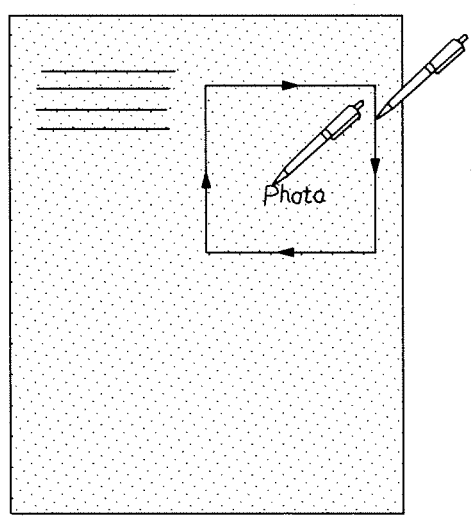

FIG. 13
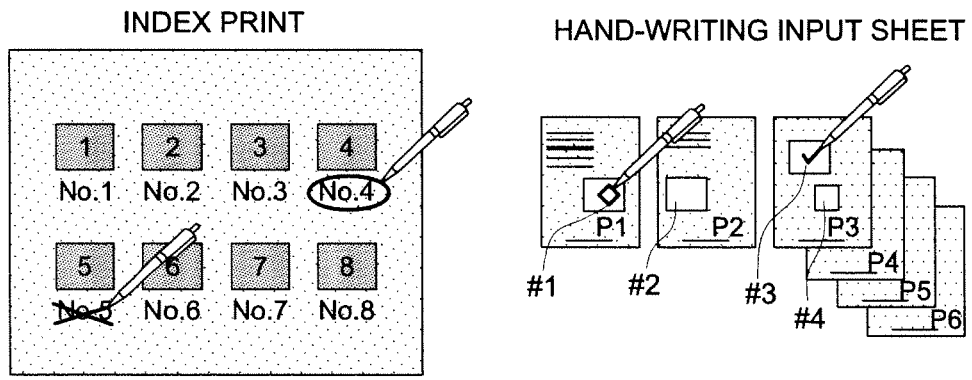
LIST OF IMAGE COMBINING INSTRUCTION INFORMATION
| RECTANGLE No. | PAGE | HEIGHT | WIDTH | POSITION | IMAGE No. |
|---|---|---|---|---|---|
| #1 | 1 | 100 | 150 | X1,Y1 | |
| #2 | 2 | 100 | 150 | X2,Y2 | |
| #3 | 3 | 100 | 150 | X3,Y3 | |
| #4 | 3 | 70 | 70 | X4,Y4 | |
| ⋮ | ⋮ | ⋮ | ⋮ | ⋮ | ⋮ |
COMBINED IMAGE AUTOMATIC SELECTION
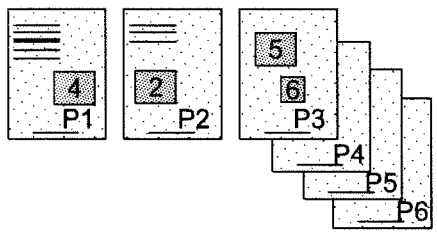
LIST OF IMAGE COMBINING INSTRUCTION INFORMATION
| RECTANGLE No. | PAGE | HEIGHT | WIDTH | POSITION | IMAGE No. |
|---|---|---|---|---|---|
| #1 | 1 | 100 | 150 | X1,Y1 | 4 |
| #2 | 2 | 100 | 150 | X2,Y2 | 2 |
| #3 | 3 | 100 | 150 | X3,Y3 | 5 |
| #4 | 3 | 70 | 70 | X4,Y4 | 6 |
| ⋮ | ⋮ | ⋮ | ⋮ | ⋮ | ⋮ |

IMAGE COMBINING APPARATUS AND IMAGE COMBINING PROGRAM

This application is based on Japanese Patent Application No. 2010-251998 filed on Nov. 10, 2010 with Japanese Patent Office, the entire content of which is hereby incorporated by reference.

BACKGROUND OF THE INVENTION

The present invention relates to an image combining apparatus and image combining program, particularly to an image combining apparatus and image combining program that use an electronic pen to combine images.

One of the input devices used in recent years is an electronic pen by which handwriting is inputted by a pen and then outputted as handwriting data. This electronic pen has a small-sized camera mounted on the pen tip. The small-sized camera is used to read a position detection pattern called the Anoto (registered trademark) pattern printed on a sheet, thereby identifying the position of the pen tip and outputting handwriting such as a handwritten character, figures and pictures as handwriting data.

An example of a system using such an electronic pen includes a printing system disclosed in the Japanese Unexamined Patent Application Publication No. 2006-163952. This printing system includes a built-in digital camera, a digital pen having a writing function, sheets exclusive for digital pen, a communication device that receives a photographic image data from the digital pen, then sends the received image to a server, and then receives edited data from the server, and an output device which includes at least a photographic image information reading section and is connected to the aforementioned communication device to output printed matters.

When the art of the aforementioned Japanese Unexamined Patent Application Publication No. 2006-163952 is utilized, an image arranged on a sheet in advance can be combined with a handwritten image written on the aforementioned image by hand in order to output a combined image. However, to create a material or the like on which a great number of object images such as photographs captured by a digital camera, photos and figures read by a scanner or photos and figures stored in a recording medium such as a USB (Universal Serial Bus) memory are arranged at prescribed positions of each page, it is necessary to use a computer device to select an image and to designate the layout of the selected image to be arranged in particular positions on a sheet or screen. Thus, it has not been easy in the conventional art to produce a combined image.

SUMMARY

The present invention has been achieved taking the aforementioned problems into consideration. A main object of the present invention therefore is to provide an image combining apparatus and image combining program that can easily produce a combined image at a prescribed position of a sheet or screen.

To achieve at least one of the abovementioned objects, an image combining apparatus reflecting one aspect of the present invention includes:

1. An image combining apparatus having:

a control section which acquires first position information for identifying a figure drawn on a first medium from an electronic pen by using the first medium on which a pattern which is used by the electronic pen to detect a position of a tip of the electronic pen is combined with a background of a list of images, and identifies an image by using the position information by referring to information for associating each of the images with a position on the first medium, wherein the control section acquires second position information for identifying a figure drawn on a second medium from the electronic pen by using the second medium on which the pattern is formed, and identifies an image combining area by using the first and second position information, and then associates the image combining area with the image;

an image processing section for creating a combined image by combining the image combining area with the image associated with the image combining area; and an output section for outputting data of the combined image.

2. The image combining apparatus described in the aforementioned item 1 wherein, if the figure drawn on the first medium is a figure which designates image identification information arranged in a vicinity of each of the images, the control section identifies the image from the first position information.

3. The image combining apparatus described in the aforementioned item 1 wherein, if the figure drawn on the second medium is a contour figure of a closed area, the control section identifies the image combining area from the second position information.

4. The image combining apparatus described in the aforementioned item 1 wherein, if the figure drawn on the second medium is a specific image drawn inside a contour figure of a closed area drawn in advance, the control section identifies the image combining area from the second position information for identifying the contour figure of the closed area.

5. The image combining apparatus described in the aforementioned item 1 wherein the control section alternately acquires the first position information and the second position information, and controls so as to associate an image identified by the first position information with the image combining area identified by the second position information, which is acquired immediately after acquiring the first position information.

6. The image combining apparatus described in the aforementioned item 1 wherein the control section alternately acquires the first position information and the second position information, and controls so as to associate the image combining area identified by the second position information with the image identified by the first position information, which is acquired immediately after acquiring the second position information.

7. The image combining apparatus described in the aforementioned item 1 wherein the first medium is an index print obtained by arranging and printing thumb-nail images of photographs.

BRIEF DESCRIPTION OF THE DRAWINGS

FIG. 9 is a diagram illustrating the process of instructing the image combining area.

FIG. 13 is a diagram illustrating the process of associating an image with an area.

DETAILED DESCRIPTION OF PREFERRED EMBODIMENT

As mentioned in the description of background of the invention, various types of systems using an electronic pen have been proposed. In the printing system disclosed in the Japanese Unexamined Patent Application Publication No. 2006-163952, a digital photographic image is outputted to a sheet exclusive for a digital pen, and letters are written thereon by a digital pen so that a photographic image containing a handwritten message is printed out. In this system, however, a handwritten image is combined with an image arranged on the sheet in advance. When such objects as photos and figures are to be arranged on the sheet, it is necessary to select an image using a computer device or to specify a position where the image is to be combined. Simple image synthesis cannot be achieved by such a conventional system.

Therefore, an embodiment of the present invention uses an electronic pen for a process of selecting an image or instructing an area for image synthesis. To put it more specifically, a first sheet (e.g., index print) with a position detection pattern printed on the background of an image list, and a second sheet with a position detection pattern printed thereon (a sheet printed with only the position detection pattern or a sheet with the position detection pattern combined with an original image) are prepared. When an image has been selected on the first sheet by the user employing an electronic pen and an image combining area has been handwritten on the second sheet, the image combining apparatus (image combining program) acquires from the electronic pen, the position information for identifying the figures drawn on the first sheet, and identifies an image by the position information by referencing the association information stored in advance. At the same time, the image combining apparatus acquires from the electronic pen, the position information for identifying the figures drawn on the second sheet, and identifies the image combining area by this position information. Based on the sequence of acquiring the position information, the image is associated with the combining area, so that a combined image made by combining images is generated at the combining area.

The aforementioned procedure allows a desired image to be easily captured into a desired position by the operation of an electronic pen alone, without using a computer device.

Example 1

Figure 1:
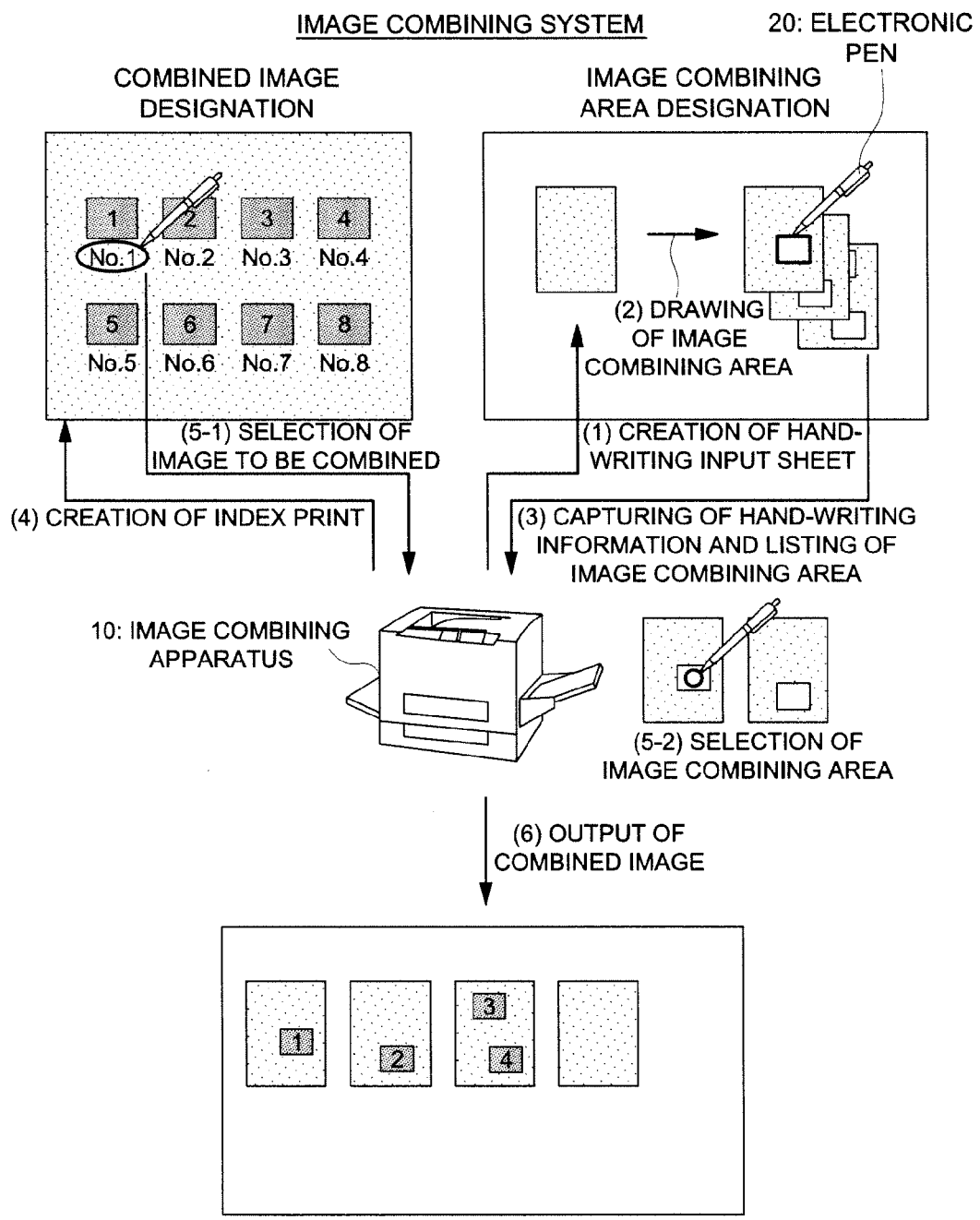
FIG. 1 is a diagram representing the structure and outline of operation of an image combining system in the first Example of the present invention.
Figure 2:
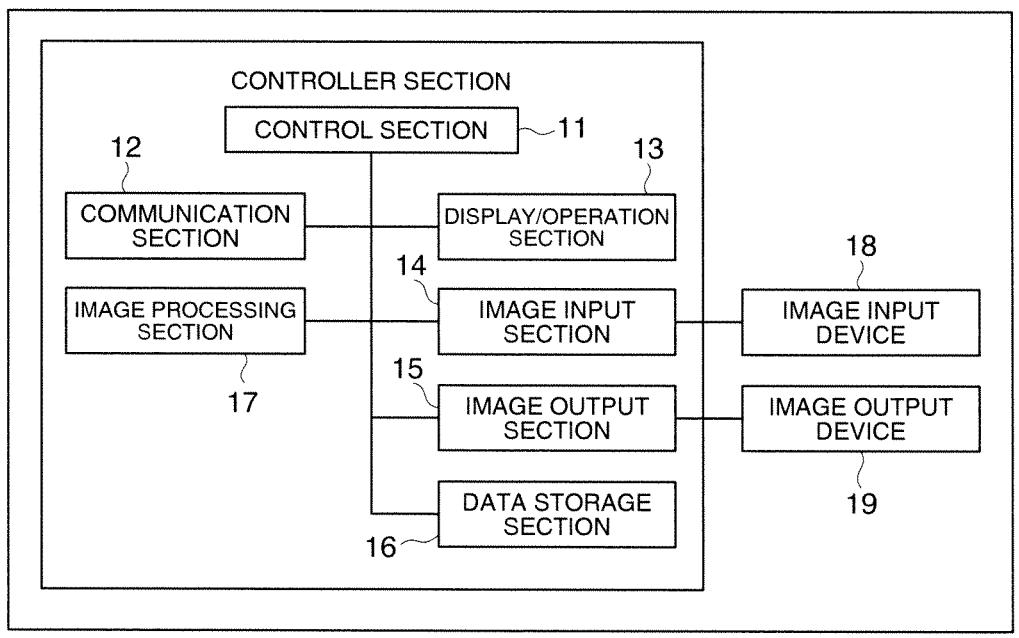
FIG. 2 is a block diagram representing the structure of the image combining apparatus in the first Example of the present invention.
Figure 3:
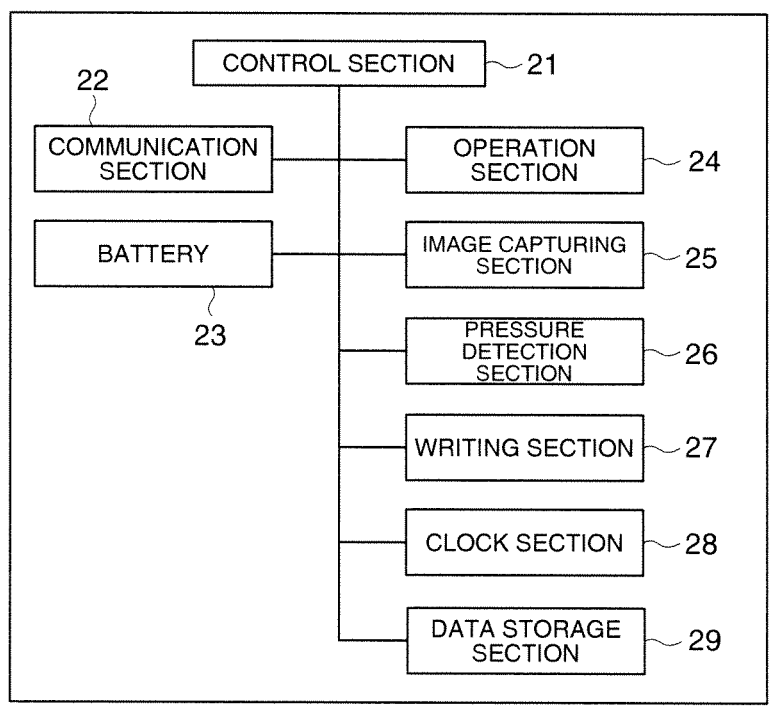
FIG. 3 is a block diagram showing the structure of an electronic pen in the first Example of the present invention.
Figure 4:
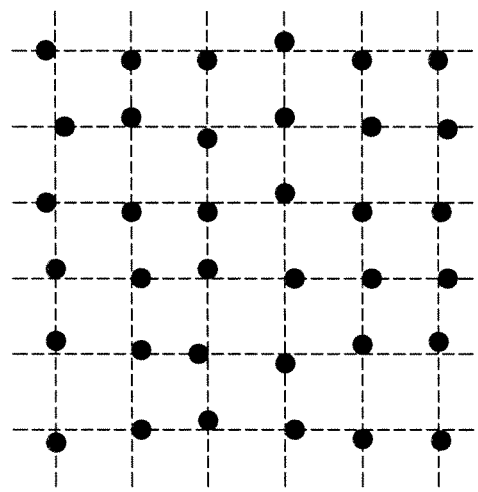
FIG. 4 is a diagram showing an example of the Anoto (registered trademark) pattern.

To give a further detailed description of the aforementioned embodiment of the present invention, the following describes the image combining apparatus and image combining program in the first Example of the present invention, with reference to FIGS. 1 through 15. FIG. 1 is a diagram representing the structure and outline of operation of an image combining system in the first Example. FIG. 2 is a block diagram representing the structure of the image combining apparatus. FIG. 3 is a block diagram showing the structure of an electronic pen. FIG. 4 is a diagram showing an example of the Anoto (registered trademark) pattern. FIGS. 5, 6, 8, 10 through 12 and 14 are flow charts showing the processing of the image combining system. FIGS. 7, 9, 13 and 15 are drawings illustrating the processing in the image combining system.

As shown in FIG. 1, the image combining system of the present Example includes an image combining apparatus 10 in which combining of the images of such objects as photos and figures is conducted at a prescribed area of such a medium as a sheet and screen, and an electronic pen 20 for detecting such a position detection pattern typically exemplified by the Anoto (registered trademark) pattern.

The operation of the aforementioned image combining system will be outlined. The image combining apparatus 10 creates a sheet (hereinafter referred to as "handwriting input sheet") printed with a position detection pattern. Letters and figures are written on this handwriting input sheet with an electronic pen 20. Not only that but an instruction is given to indicate on which page and in which position the image to be combined is inputted (operation of drawing an image combining area). Further, an instruction is given to indicate in which image combining area an image is combined (operation of selecting an image combining area). The electronic pen 20 having performed such a handwritten operation stores handwriting information including the handwritten image denoting the locus of the electronic pen 20 having moved, and information on handwritten time. This handwriting information is captured by the image combining apparatus 10.

In the meantime, the image to be combined is captured by a digital camera or similar device and is stored in a memory card, image combining apparatus 10 or server as the image data of a prescribed format. The image combining apparatus 10 reads such image data and outputs the index print having a position detection pattern combined with the background of the list of images (e.g., thumb-nail images) based on the image data. This index print has such identification information as an image number printed in the vicinity of each image. For example, this identification information is marked by the electronic pen 20 (image selecting operation). The electronic pen 20 having performed such an operation stores the handwritten image denoting the locus of the electronic pen 20 having moved, and the handwriting information including information on the handwriting time. This handwriting information is captured by the image combining apparatus 10.

After that, based on the handwriting information captured from the electronic pen 20, the image combining apparatus 10 associates the image with the image combining area. For example, the image combining area is identified from the handwriting information on the handwriting input sheet, and the image is identified from the handwriting information on the index print with reference to the association information for defining the position of each image on the index print. Based on the sequence of acquiring the handwriting information, the image is associated with the image combining area. Then the image is combined in the image combining area and the combined image is printed or outputted in the form of a file.

In the present Example, the aforementioned image combining apparatus 10 is a device provided with a printing function for creating a handwriting input sheet and index print (e.g., an image forming apparatus including a copying machine or MFP (Multi Function Peripheral)). When a position detection pattern is to be displayed on a screen, the image combining apparatus 10 can be a device provided with a display function (e.g., electronic paper, electronic book, portable terminal and computer device). In this case, a handwritten input screen or index screen is used for at least one of the handwriting input sheet and index print. The following describes the structure of each device with reference to drawings.

[Image Combining Apparatus]

As shown in FIG. 2, the image combining apparatus 10 is made up of a controller section and various devices controlled by the controller section. The controller section includes a control section 11, communication section 12, display/operation section 13, image input section 14, image output section 15, data storage section 16, and image processing section 17.

The control section 11 includes such memories as a CPU (Central Processing Unit), ROM (Read Only Memory) and RAM (Random Access Memory). The CPU ensures that the control program stored in the ROM is developed in the RAM and is executed, and provides overall control of the image combining apparatus 10. Especially in the present Example, the CPU implements a process of reading the position detection pattern from the memory or an external computer device and allowing the image output device 19 to print out the handwriting input sheet by controlling the image output section 15, a process of acquiring image data from a digital camera, the image combining apparatus itself or a remote apparatus (a server linked to the image combining apparatus 10 via the network) (or acquiring the storage location information of the relevant image data), combining the position detection pattern with the background of the list of information for identification of image and/or image data based on the image data by controlling the image processing section 17, and allowing the image output device 19 to print an index print by controlling the image output section 15. Further, the CPU implements a process of acquiring the handwriting information on index print and handwriting information on the handwriting input sheet from the electronic pen 20, identifying the image from the handwriting information on index print, identifying the image combining area from the handwriting information on the handwriting input sheet, and associating the image with the image combining area based on the sequence of acquiring the handwriting information, and a process of combining each image combining area with the image or the storage location information (e.g., an address to be linked) of source image data of this image by controlling the image processing section 17, allowing the image output device 19 to print out the combined image by controlling the image output section 15, or outputting the combined image data through the communication section 12. At the time of creating the index print, a step is taken to create the information for associating the image or identification information of this image with the position on the index print. This information is stored in the data storage section 16, so that an image can be identified form the handwriting information on index print by reference to this association information.

The communication section 12 serves as an input section for inputting image data from a digital camera or server by controlling various protocols, inputting the handwriting information from the electronic pen 20, and downloading the position detection pattern from the computer device. The communication section 12 also serves as an output section for transmission of combined image data to an external computer device.

The display/operation section 13 is a touch panel or similar device where transparent electrodes are arranged in a grid-like pattern on the LCD (Liquid Crystal Display) or organic EL (electroluminescence) display. The display/operation section 13 is used to display information for users and to input information by users.

The image input section 14 controls the image input from the image input device 18 (e.g., scanner), and is used to control capturing of the image to be combined with the position detection pattern or the image to be combined with the image combining area when a handwriting input sheet is created. It should be noted that the image input section 14 and image input device 18 can be omitted, when only the image acquired from a digital camera, the image combining apparatus itself or a server is used.

The image output section 15 controls the image output to the image output device 19 (e.g., printer), and is used to control the printing of a position detection pattern, and printing of the combined image formed by the combination between an image combining area and an image or the storage location information of the image.

The data storage section 16 is formed of a HDD (Hard Disk Drive) or the like, and is used to store image data, handwriting information, the aforementioned association information, information of the system and so on.

The image processing section 17 performs processing such as combining the position detection pattern into a handwriting input sheet, generating an index image, combining an index image and position detection pattern, combining an image to the image combining area, and multiple changing, rotation and trimming of the image to be combined to the image combining area.

In FIG. 2, image combination processing is performed by the image processing section 17. An image combining program running in the control section 11 can also be used to perform the following series of operations. The handwriting information and selected image information are inputted and associated with each other, the image identified by the selected image information is combined to the image combining area identified by the handwriting information, and then the resulting information is outputted.

[Electronic Pen]

As shown in FIG. 3, the electronic pen 20 is formed of a control section 21, communication section 22, battery 23, operation section 24, image capturing section 25, pressure detection section 26, writing section 27, clock section 28 and data storage section 29.

The control section 21 is made of a CPU and such memories as a ROM and RAM. The CPU develops the control program stored in the ROM, into the RAM to execute, thereby taking overall control of the electronic pen 20.

The communication section 22 controls transmission of the handwriting information to the image combining apparatus 10 by short-distanced wireless communication such as Bluetooth (registered trademark), infrared communication or wired communication.

The battery 23 is a primary battery or secondary battery, and supplies power to various parts of the electronic pen 20.

The operation section 24 includes a button provided on the main body of the electronic pen 20, and is used to give an instruction of the start or stop of handwriting, and an instruction to transmit handwriting information to the image combining apparatus 10.

The image capturing section 25 is a small-sized CCD or CMOS (Complementary Metal Oxide Semiconductor) video camera to read a position detection pattern.

The pressure detection section 26 is a piezoelectric element for detecting the writing pressure of the electronic pen 20, for example.

When the writing pressure has been detected by the pressure detection section 26, the writing section 27 identifies the position of the electronic pen 20 on the handwriting input sheet based on the position detection pattern read by the image capturing section 25, and generates an handwritten image identified in conformity to the locus of the electronic pen 20 having moved. It should be noted that a handwritten image in the present specification denotes an image that can be recognized as one object, not an image that is identified by the entire locus of the electronic pen 20 having moved on the handwriting input sheet. For example, the character and figure drawn with a single stroke of the electronic pen 20 without being removed from the handwriting input sheet can be recognized as one object and regarded as forming one unit of handwritten image. Further, one unit of handwritten image need not be restricted to an image drawn with a single stroke. For example, the character and figure drawn within a prescribed time period, even if the electronic pen 20 is removed from the handwriting input sheet, can be handled as one handwritten image. Further, the character and figure in which individual loci are concentrated within a prescribed distance, even if the electronic pen 20 is removed from the handwriting input sheet, can also be handled as one handwritten image. Thus, a figure such as a semi-circle can be handled as one handwritten image even if drawn with a single stroke or drawn according to the stroke order of writing the alphabetical letter "D".

The clock section 28 identifies the time when a handwritten image is generated by the writing section 27.

The data storage section 29 is a flash memory or the like that stores the handwritten image generated by the writing section 27 and time information identified by the clock section 28 being associated with each other. In this case, it is sufficient if at least one piece of time information can be associated with each handwritten image. For example, when time information is acquired every time the position detection pattern is read by the image capturing section 25, time information can be associated with each point of the handwritten image. When time information is acquired at a specific point such as the starting point or end point of the locus of the electronic pen 20 having moved, the time information in conformity to the number of the points can be associated with each handwritten image.

The electronic pen 20 is only required to have functions of recognizing the position detection pattern printed on the sheet or shown on the screen, identifying the position on the sheet or screen, associating the handwritten image with time information, and outputting the resulting information as handwriting information, without any restriction in the structure, shape and communication method.

FIG. 4 is a diagram showing an example of the Anoto (registered trademark) pattern printed on the handwriting input sheet or shown on the screen. This Anoto (registered trademark) pattern is a dotted pattern of grid-like arrangement. Each dot is slightly deviated either upward, downward, right or left from the grids that are perpendicular and arranged at intervals of 0.3 mm. This pattern is read in units of 36-dot matrix (6 by 6 dots) at one time by the image capturing section 25. This Anoto (registered trademark) pattern has a unique value at any point. All the loci drawn by the electronic pen 20 having moved are recognized as different position information.

The following describes the operation of the image combining system in the present Example with reference to the flow charts of FIGS. 5, 6, 8, 10 through 12 and 14, and the explanatory diagrams of FIGS. 7, 9, 13 and 15.

Figure 5:
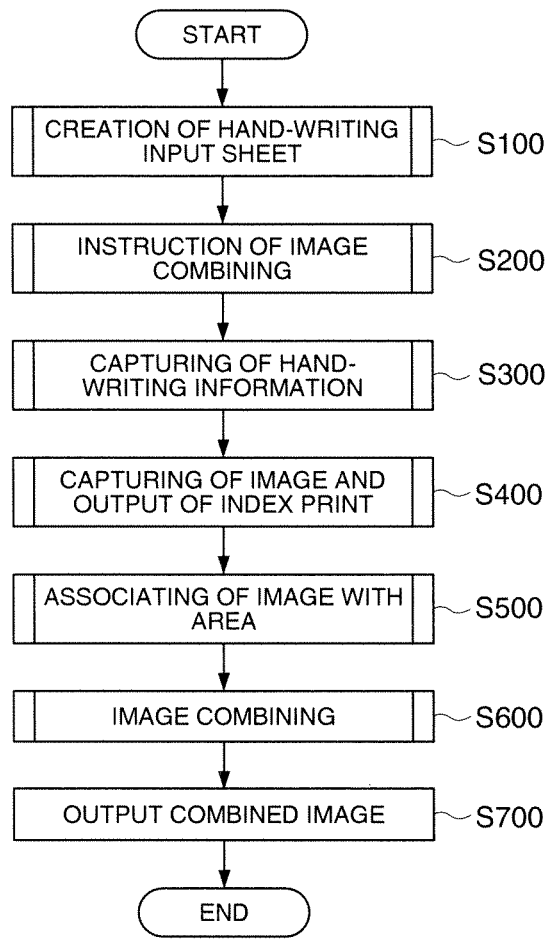
FIG. 5 is a flow chart showing the overall processing of the image combining system in the first Example of the present invention.

The outline of operation of the image combining system in the present invention is illustrated in FIG. 5. In the first place, the image combining apparatus 10 creates a handwriting input sheet printed with a position detection pattern (S100). The user employs the electronic pen 20 to handwrite on the handwriting input sheet and to give an instruction about the image combining area (S200). The image combining apparatus 10 captures handwriting information from the electronic pen 20 and creates a list of image combining instruction information (S300). This is followed by the step of capturing image data from a digital camera, the image combining apparatus itself or a server (or identifying the image data storage location information). A position detection pattern is combined with the background of the list of images based on image data and/or image data identification information, and the index print resulting from this combination is outputted (S400). When the user has selected an image on the index print and has chosen the image combining area on the handwriting input sheet by using electronic pen 20, the image combining apparatus 10 identifies an image based on the handwriting information on the index print and identifies the image combining area based on the handwriting information on the handwriting input sheet. The image is then associated with the image combining area based on the sequence of acquiring the handwriting information (S500). The image or image data storage location information is combined with the image combining area (S600), and the combined image is outputted (S700). The following describes the each of the steps.

[Creation of Handwriting Input Sheet in S100]

Figure 6:
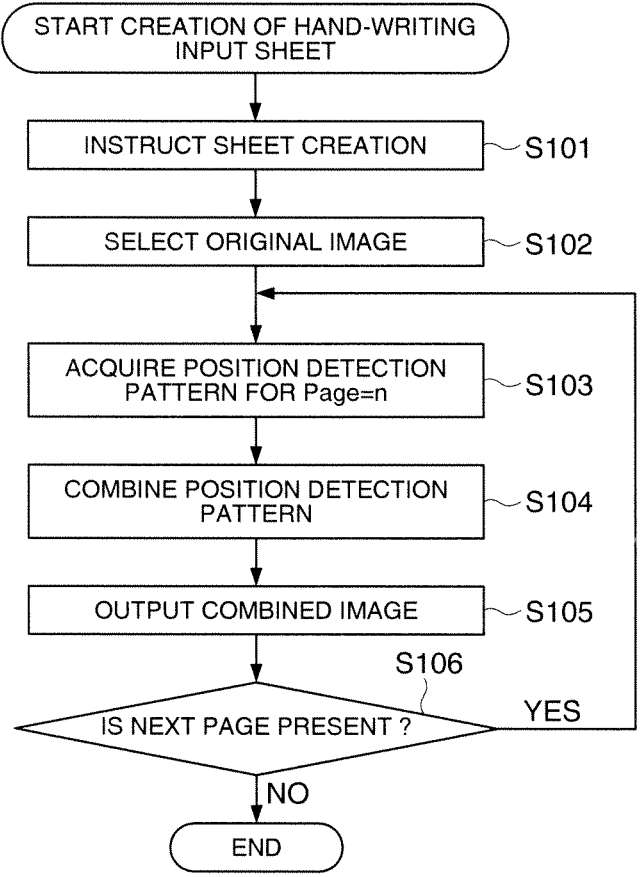
FIG. 6 is a flow chart showing a process of creating a handwriting input sheet in the first Example of the present invention.

As shown in FIG. 6, the user operates the display/operation section 13 of the image combining apparatus 10 to give an instruction to create a handwriting input sheet (S101). The original image to be combined with the handwriting input sheet is then selected (S102). In this case, it is assumed that whether or not the original image is to be combined can be selected, and that, if the original image is to be combined, one method out of a method of specifying the file name and inputting the same from the computer device and a method of capturing the image by the image input device 18 (scanner) and so on can be selected.

After reading the original image based on the result of selection in S102, the controller section (control section 11) of the image combining apparatus 10 acquires the position detection pattern to be printed on the page out of the position detection patterns stored in the data storage section 16 in advance (S103), and image processing section 17 combines the position detection pattern with the original image (S104). Then the image output section 15 sends the combined image to the image output device 19 (printer), and the image output device 19 prints the combined image on the handwriting input sheet (S105). As will be described later, this handwriting input sheet is provided with a command button and others to instruct to combine the input image. After that, the control section 11 determines if there is a next page (S106). If there is a next page, the operation goes back to S103, and the same procedure is repeated.

Figure 7:
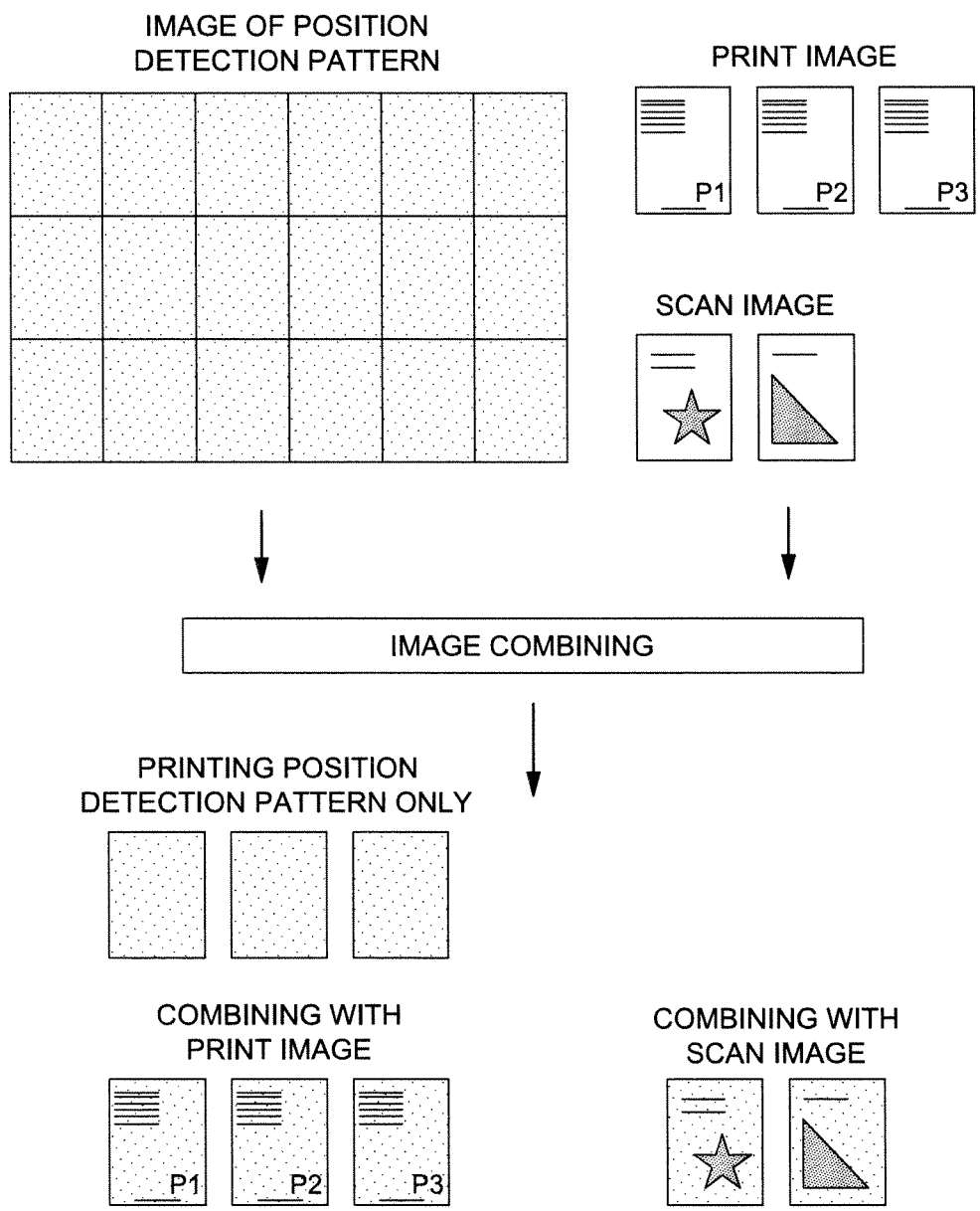
FIG. 7 is a diagram illustrating the process of creating a handwriting input sheet.

FIG. 7 is a diagram schematically showing the process of creating a handwriting input sheet. The data storage section 16 stores position detection patterns for plural pages. Different position detection patterns are printed on each page. Further, when absence of original image has been selected in S102, only the position detection pattern is printed on the handwriting input sheet. If a file has been chosen in S102, a combined image with the print image superimposed on the position detection pattern is printed on the handwriting input sheet. If image capturing has been chosen in S102, a combined image with the position detection pattern superimposed on the scanned image is printed on the handwriting input sheet.

In the present Example, a handwriting input sheet is printed. However, when handwriting is used on the screen, it is also possible to arrange such a configuration that an image consisting of a position detection pattern alone, an image having a position detection pattern combined with a printed image or an image having a position detection pattern combined with a scanned image is displayed on the display section.

[Instruction of Image Combination in S200]

Figure 8:
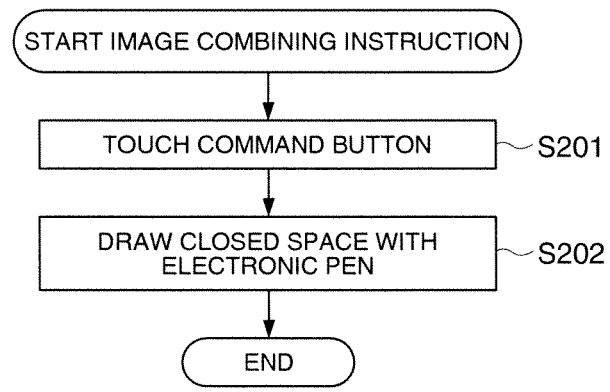
FIG. 8 is a flow chart showing the process of instructing the image combining area in the first Example of the present invention.

As shown in FIG. 8, image combining is instructed by touching the command button of the page where an image is to be placed (S201) and then making a drawing by the electronic pen 20 so as to form a closed area (S202). This procedure is repeated the same number of times as the number of the images to be combined. In this case, the data storage section 29 of the handwriting pen 20 stores a series of position information (handwritten images) identified by the position detection pattern recognized by the image capturing section 25, and time information indicating the time of handwriting operations, being associated with each other.

The instruction of image combining is given by inputting the location for placing the image and size of the image with the electronic pen 20. This instruction can be given by the three methods illustrated in FIG. 9 for example.

The first method for instruction is illustrated in the flow chart of FIG. 8. The electronic pen 20 is employed to touch the portion of the command button printed in advance on the handwriting input sheet. After that, a contour (circle in this case) of a closed area is drawn. In this case, when inputting through the command button and drawing of the contour of the closed area have been detected, the system recognizes that the image combining instruction has been given. In the step of capturing the handwriting information shown below, the image combining instruction is assumed to be given by this method.

In the second instruction method, a contour of a closed area (a rectangle in this case) is drawn and a specific mark (check mark in this case) is drawn in this area. In this case, the drawing of the contour of the closed area is recognized. If this is followed by the step of inputting a specific mark therein, the system understands that an image combining instruction has been given.

In the third instruction method, a specific character ("photo" in this case) is drawn. This is followed by the operation of drawing a contour of a closed area (rectangle in this case) so as to enclose the character. In this case, the specific character is recognized. If this is followed by inputting of a contour of the closed area, the system understands that an image combining instruction has been given.

It should be noted that the image combining instruction method is not restricted to the aforementioned methods. For example, in the first instruction method, the command button can be touched after a contour of a closed area has been drawn. In the second instruction method, after a specific mark has been drawn, a contour of a closed area can be drawn so as to enclose the mark. In the third instruction method, after a contour of a closed area has been drawn, a specific character can be drawn therein. Further, according to the above description, a circle is drawn in the first instruction method. A rectangle is drawn in the second and third instruction methods. However, any figures representing a contour of a closed area can be used.

[Capturing of Handwriting Information in S300]

Figure 10:
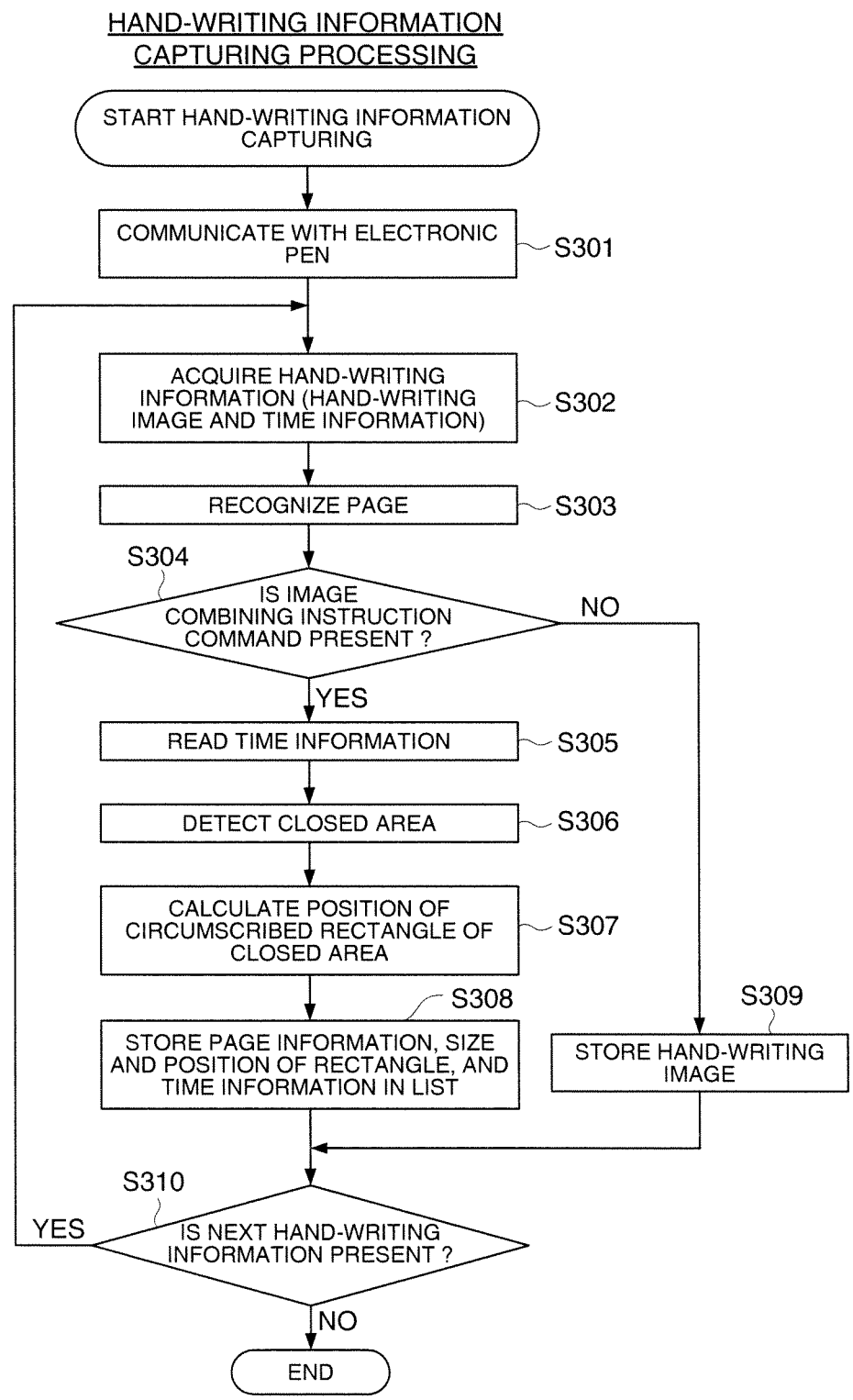
FIG. 10 is a flow chart showing the process of capturing the handwriting information in the first Example of the present invention.

As shown in FIG. 10, firstly, the controller (control section 11) of the image combining apparatus 10 communicates with the electronic pen 20 by wireless communication, infrared communication, wired communication or the like (S301), obtains the handwriting information (handwritten image and time information) stored in the electronic pen 20 (S302), and identifies the page from the position information on the obtained handwritten image (S303).

Next, the control section 11, by checking whether or not the position information of the handwritten image indicates the area of the command button defined in advance, detects the image combining instruction command (S304). When the image combining instruction command has not been detected, the control section 11 allows the handwritten image to be stored in the data storage section 16 as regular handwriting information (S309).

In the meantime, when the image combining instruction command has been detected, the control section 11 reads the time information associated with the handwritten image (S305), and detects a closed area illustrated as the handwritten image (S306). Then the control section 11 calculates the position of circumscribed rectangle of the closed area (S307). The information on page, the image combining instruction information on the size and position (coordinates) of the rectangle and, if required, containing the time information are formulated into a list by the control section 11 and is stored in the data storage section 16 (S308).

The control section 11 determines if there is the next handwriting information or not (S310). If the next handwriting information is present, control goes back to S302 to repeat the same procedures.

[Image Capturing and Index Print Outputting in S400]

Figure 11:
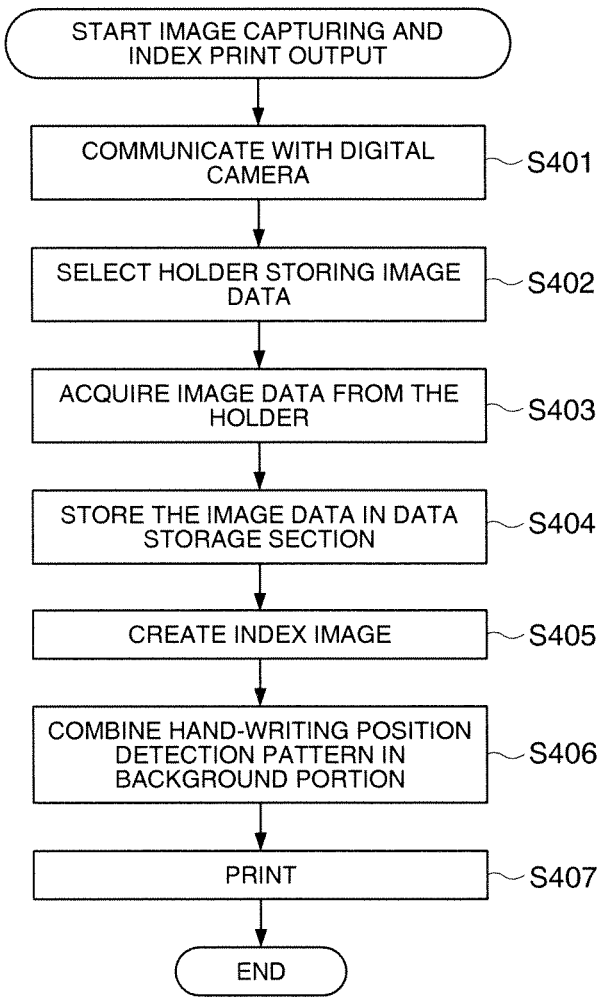
FIG. 11 is a flow chart showing the process of image capturing and index print output in the first Example of the present invention.

Firstly, the user employs a digital camera to pick up a still image or moving images to be combined. The obtained image data is stored in the data storage section of the digital camera, image combining apparatus 10 or server. As shown in FIG. 11, the controller (control section 11) of the image combining apparatus 10 communicates with the digital camera or server containing the image data by wireless communication, infrared communication or wired communication (S401). The controller then makes the display/operation section 13 display the folder of the data storage section of the digital camera, the apparatus itself or a server.

Next, when the user operates the display/operation section 13 and selects the folder where the image data is stored (S402), the control section 11 acquires the image data from the selected folder (S403) and stores it in the data storage section 16 (S404). The image data to be stored is provided with additional information on the time of image capture, storage time, file name (tile number) and image size or the like.

Then, the image processing section 17 creates an index image by arranging the images (e.g., thumb-nail images) based on the image data stored in the data storage section 16 (S405). The position detection pattern is superimposed on the background of the index image (S406). The image output section 15 sends the combined image to the image output device 19 (printer). The image output device 19 prints the combined image and outputs an index print (S407). This index print has identification information such as image number and attribute information printed in the vicinity of each thumb-nail image. Further, when an image is arranged, information for associating each image with the position on the index print is created, and is stored in the data storage section 16 or a similar device.

In the above description of the structure, the index print is printed with an image. It is also possible to arrange such a configuration that the image data storage location information is printed. Further, according to the above description of the structure, the image data is captured and stored in the data storage section 16. However, in the case where the image data storage location information is to be combined in the image combining step to be described later, the image data need not always be captured. It is sufficient only if the directory information of the folder containing the image data is acquired and stored in the data storage section 16. Also, in the present Example, an index print is printed. However, in the case where an image is selected on the screen, it is also possible to make such arrangements that the index image provided with images or storage location information is combined with a position detection pattern and the resulting combined image is displayed on the display section.

[Association of Image with Area in S500]

Figure 12:
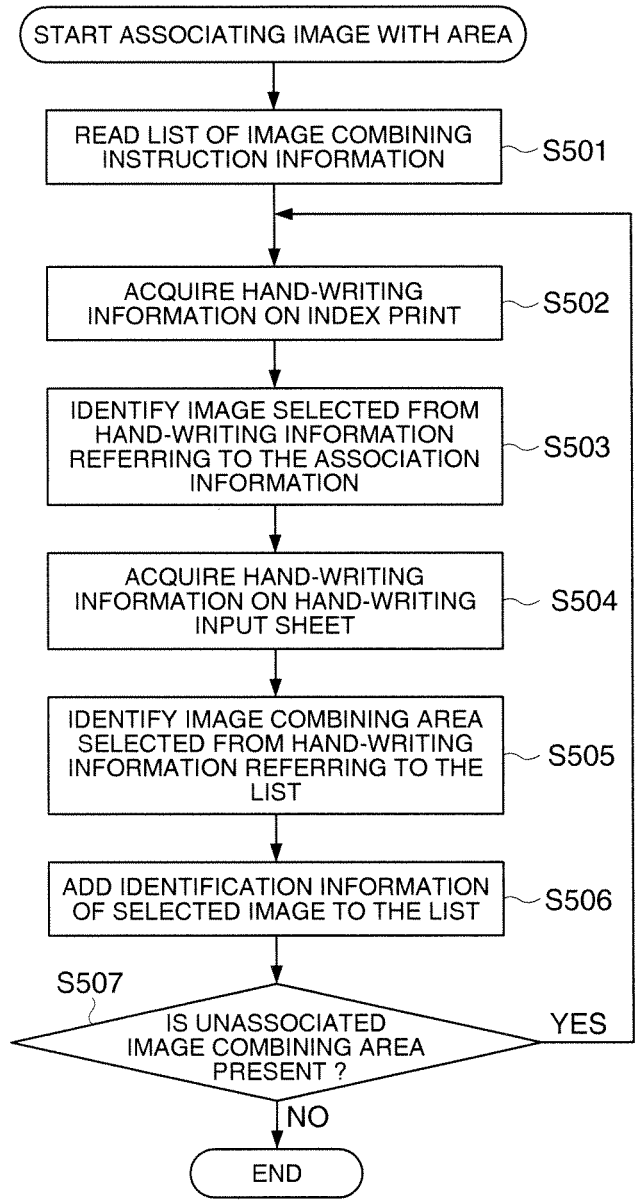
FIG. 12 is a flow chart showing the process of associating an image with an area in the first Example of the present invention.

As shown in FIG. 12, in the process of handwriting information capturing in S300, the controller (control section 11) of the image combining apparatus 10 reads the list of the image combining instruction information stored in the data storage section 16 (S501).

This is followed by the step of the user employing the electronic pen 20 to apply a prescribed handwriting operation to the identification information such as an image number described in the vicinity of the image of the index print. When the image has been selected by this procedure, the control section 11 receives handwriting information from the electronic pen 20 by wireless communication, infrared communication or wired communication (S502), references the association information stored in the data storage section 16 in advance, and then identifies an image associated with the position specified by handwriting information (S503).

Then the user employs the electronic pen 20 to perform it a prescribed handwriting operation within the image combining area of the handwriting input sheet. When the image combining area has been selected by this procedure, the control section 11 receives handwriting information from the electronic pen 20 by wireless communication, infrared communication or wired communication (S504), references the image combining instruction information list, and then identifies the image combining area associated with the position specified by the handwriting information (S505).

The control section 11 ensures that the file names or the thumb-nail image of the image specified are displayed as required on the display/operation section 13 for confirmation with the user. After that, the control section 11 allows the identification information of the specified image to be added to the list of the image combining instruction information for storage (S506). After that, the control section 11 determines whether or not there is an image combining area with which an image is not associated (S507). If there is an image combining area with which an image is not associated, control goes back to S502 to repeat the same procedure.

In the above description, after the image has been selected on the index print, the image combining area is selected on the handwriting input sheet. However, an image can be selected on the index print after the image combining area has been selected on the handwriting input sheet. Instead of selecting an image combining area on the handwriting input sheet, it is also possible to designate image combining areas sequentially from the image combining instruction information list, and to select the images on the index print to be associated with specified image combining areas sequentially. In the above description, images and image combining areas are selected one by one alternately to be associated. However, it is also possible to make such arrangements that, after plural images (or image combining areas) have been selected, the same number of image combining areas (or images) are selected and are sequentially associated.

FIG. 13 is a diagram schematically showing the process of associating an image with an area. The image to be captured is the image acquired by a digital camera or the like. The index print has a position detection pattern printed on the background of the image so that the image to be used can be selected by the electronic pen 20. Identification information such as an image number is described in the vicinity of each image. To identify the image to be captured, handwriting operation is performed, for example, by using the electronic pen 20 to enclose the identification information or to draw an x-mark on the identification information.

In the meantime, the image combining area is selected by using the handwriting input sheet where the image combining area is handwritten in advance by the electronic pen 20. Similar to the case of selecting an image, the image combining area is selected by handwriting a circle or check mark within the image combining area.

Then, an image is identified from the handwriting information of handwriting on the index print by referencing the association information. The image combining area is identified from the handwriting information of handwriting on the handwriting input sheet by referencing the image combining instruction information list. Based on the sequence of acquiring the handwriting information, the image selected on the index print is associated with the image combining area selected on the handwriting input sheet. The result is reflected in the image combining instruction information list. For example, if the rectangle #1 is selected on the handwriting input sheet after the image data No. 4 is selected on the index print, "4" is added to the "Image No." column corresponding to the rectangle #1 of the image combining instruction information list. If the rectangle #3 is selected on the handwriting input sheet after the image data No. 5 is selected on the index print, "5" is added to the "Image No." column corresponding to the rectangle #3 of the image combining instruction information list.

[Image Combining in S600]

Figure 14:
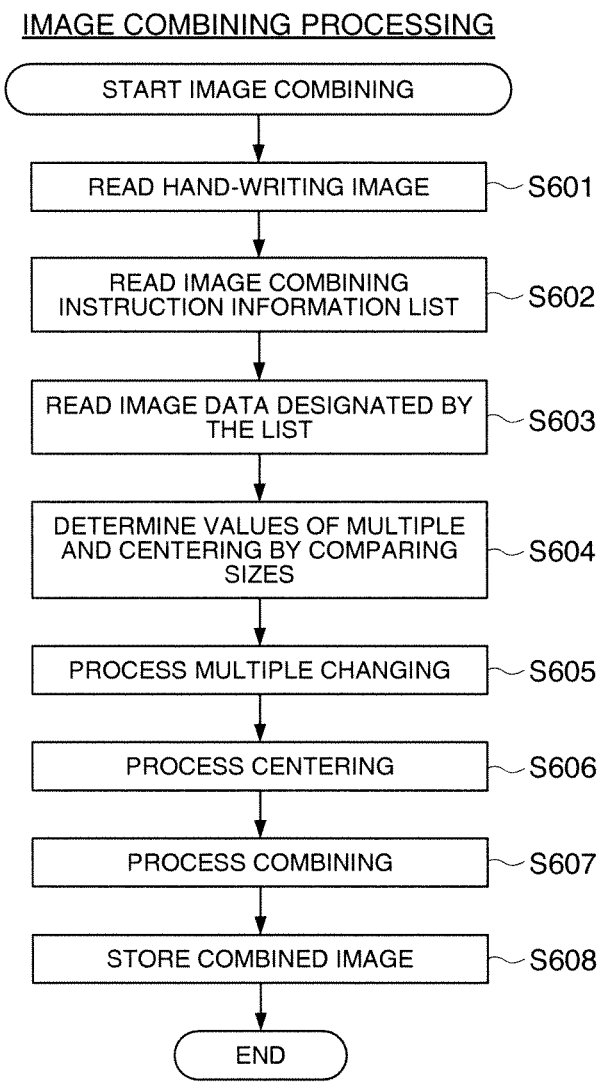
FIG. 14 is a flow chart showing the image combining process in the first Example of the present invention.

As shown in FIG. 14, the controller (image processing section 17) of the image combining apparatus 10 reads the handwritten image, image combining instruction information list and image data (or image data storage location information) specified in the list from the data storage section 16 (S601 to S603). Next, the image processing section 17 makes comparison between the size of the rectangle defined by the image combining instruction information and the size of the image based on the image data to be combined with the rectangle, and determines the values of variable magnifying power and centering so that the image will be fitted into the rectangle (S604). Based on the determined value, the image processing section 17 applies the process of multiple changing and process of centering to each image (S605, S606). After that, the image processing section 17 performs the process of image combination (S607), and stores the combined image data in data storage section 16 (S608).

Figure 15:
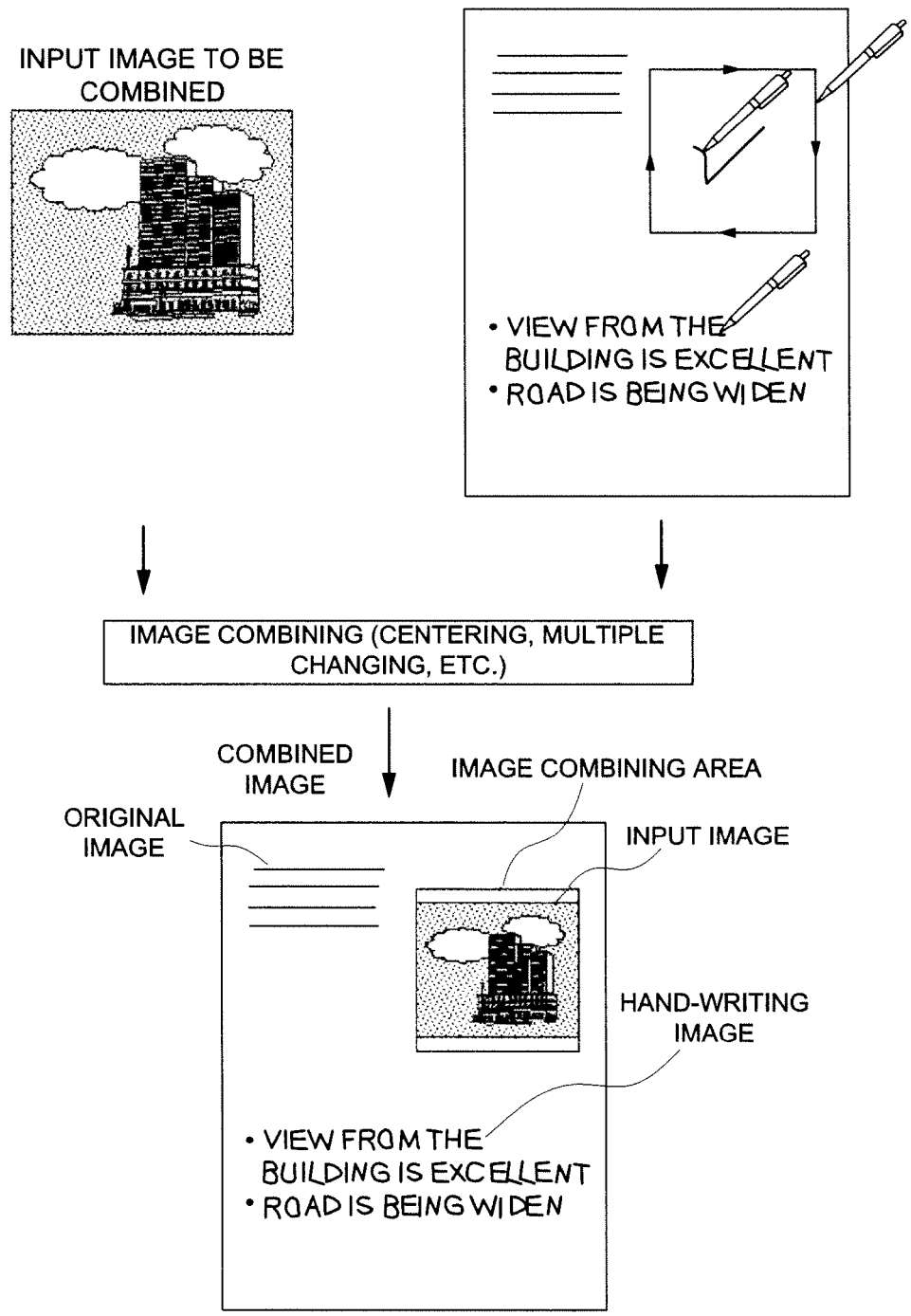
FIG. 15 is a diagram illustrating the image combining process.

FIG. 15 is a diagram schematically showing the aforementioned process of image combining. For example, if there is a difference in size between the input image to be combined and the rectangle, the image is enlarged or reduced in size so that the image will be fitted into the rectangle. If there is a difference in the aspect ratio between the input image to be combined and the rectangle, the process of centering is implemented so that the image will be arranged approximately at the center of the rectangle. Thus, a page image is generated by combining the input image (or input image storage location information) and handwritten image with the original image. Here the input image and handwritten image are combined with the original image. However, only the input image can be combined with the original image, or combining the input image and handwritten image only is possible.

[Combined Image Output in S700]

The controller (control section 11) of the image combining apparatus 10 ensures that the combined image data generated by the image processing section 17 is sent to the image output section 15. The image output section 15 controls the image output device 19 to print out the combined image which is formed by combining the original image with the input image (or input image storage location information) and handwritten image. It is also possible to adopt such a structure that the combined image data is outputted to the user's computer device, and the combined image is displayed on the display section of the computer device. When the input image storage location information has been combined, it is also possible to adopt such a structure that, when the storage location information is clicked, the image data is captured from the storage location and the input image is displayed. Further, it is also possible to output the combined image data to a server or USB (Universal Serial Bus) memory to store the combined image data in it. Alternatively, the combined image data can be transmitted by e-mail.

As described above, the following control is provided in the image combining apparatus 10 of the present Example. When the handwriting information for specifying the image combining area drawn by the user on the handwriting input sheet has been acquired from the electronic pen 20, an image combining instruction information list is created. After that, when an image is selected on the index print and an image combining area is selected on the handwriting input sheet, the image and image combining area are associated based on the sequence of acquiring the handwriting information from the electronic pen 20. The combined image data with the image or the image data storage location information as a source of this image combined with the image combining area is outputted.

The aforementioned control procedure ensures easy image combination on a prescribed position of a sheet or a screen.

Example 2

Figure 16:
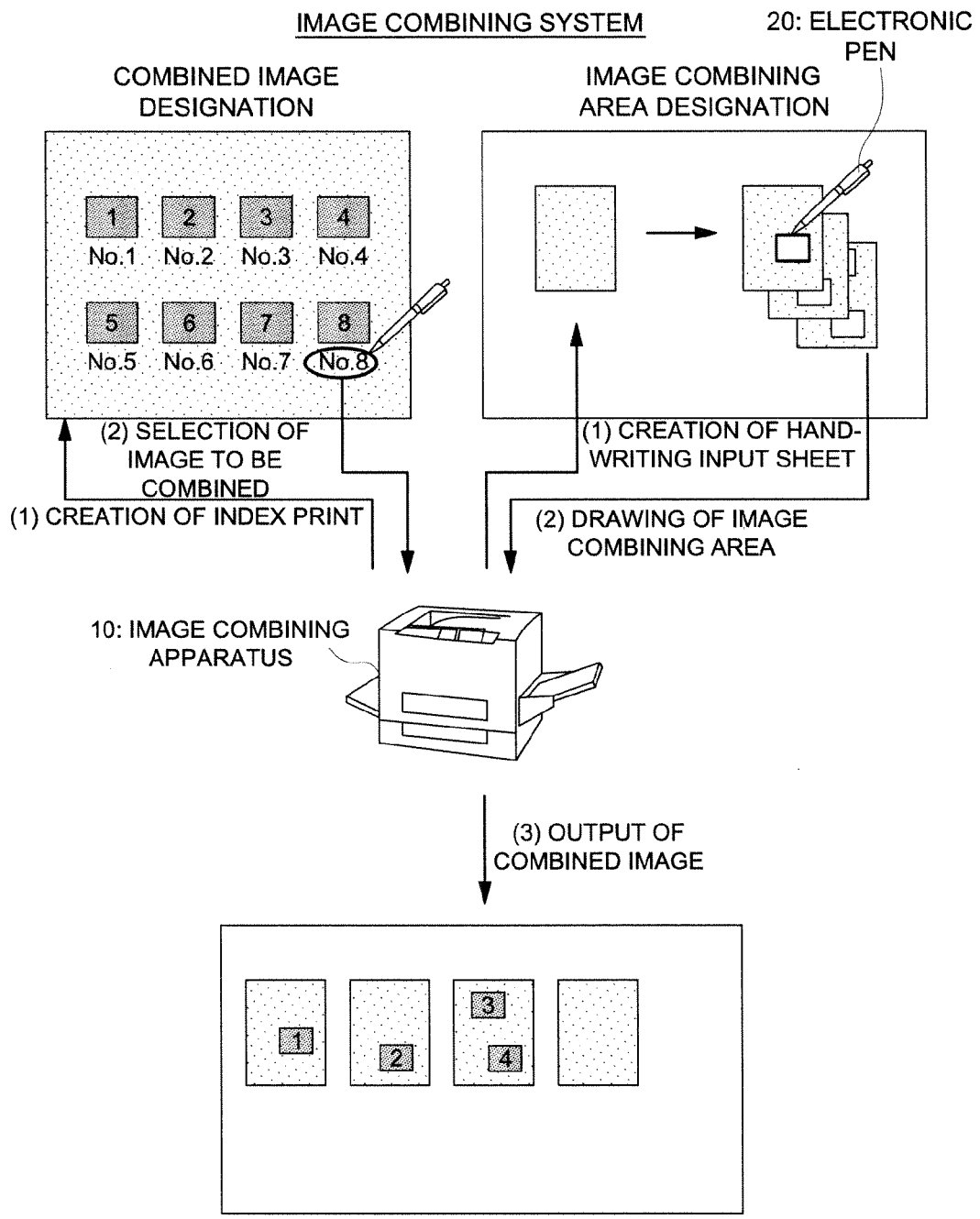
FIG. 16 is a diagram showing the structure and outline of operation of an image combining system in the second Example of the present invention.
Figure 17:
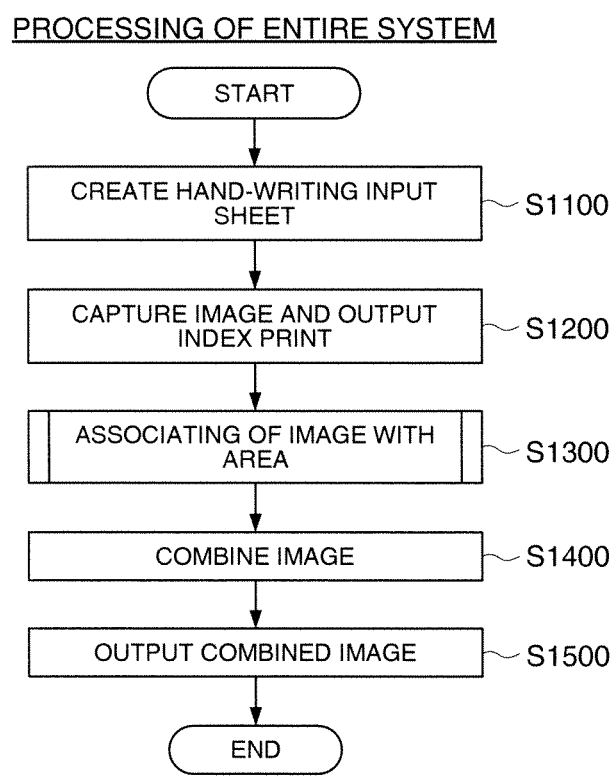
FIG. 17 is a flow chart showing the overall processing of the image combining system in the second Example of the present invention.
Figure 18:
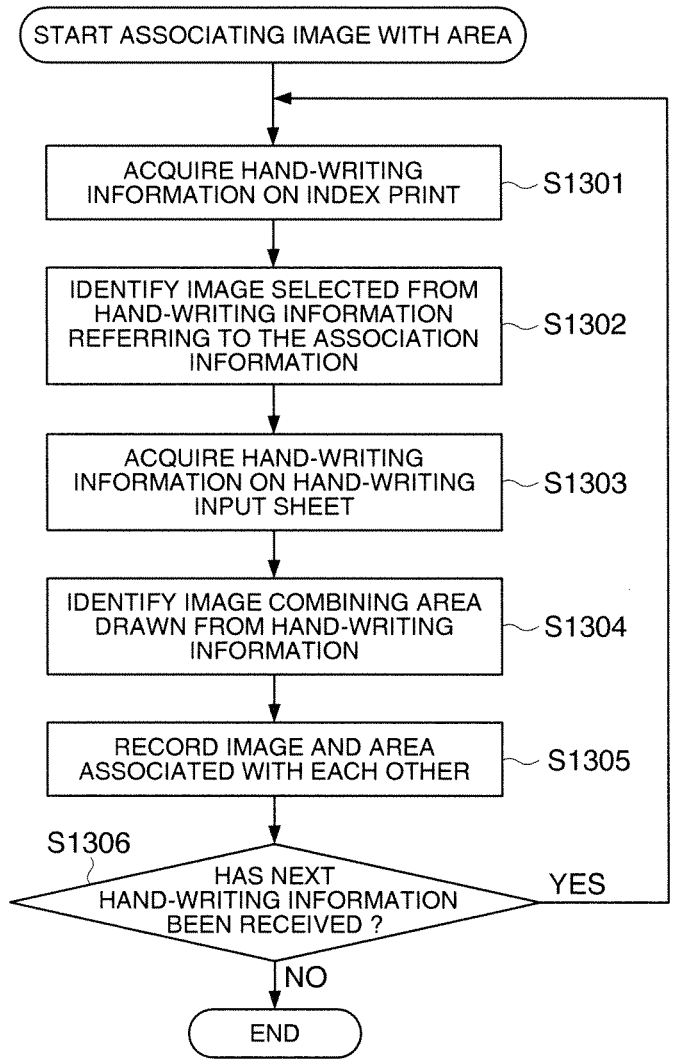
FIG. 18 is a flow chart showing the processing of associating an image with an area in the second Example of the present invention.
Figure 19:
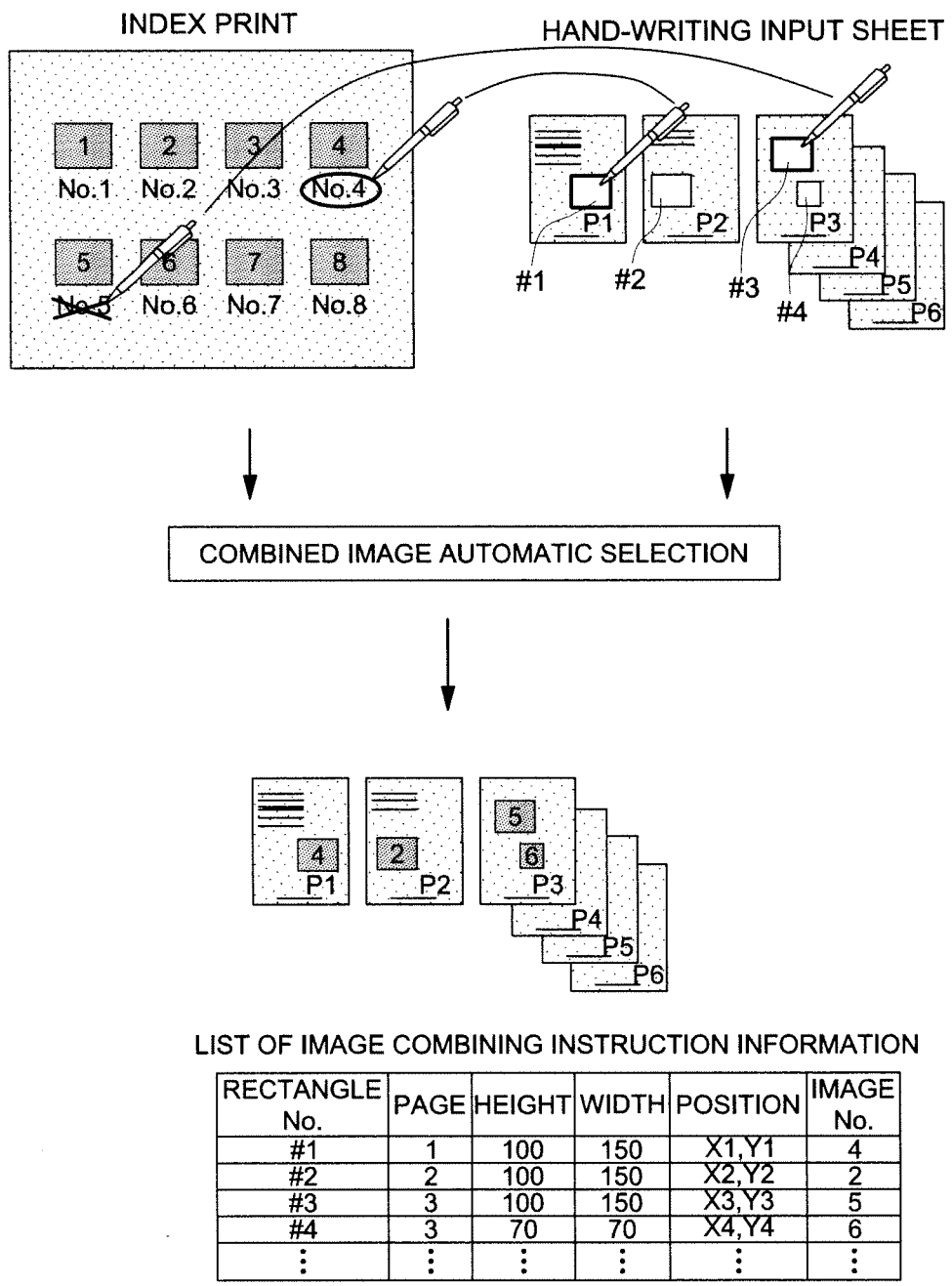
FIG. 19 is a diagram illustrating the process of associating an image with an area.

Referring to FIGS. 16 through 19, the following describes the image combining apparatus and image combining program in a second Example of the present invention. FIG. 16 is a diagram showing the structure and outline of operation of the image combining system in the present Example. FIG. 17 is a flow chart showing the overall processing of the image combining system. FIG. 18 is a flow chart showing the processing of associating an image with an area. FIG. 19 is a diagram describing the process of associating an image with an area.

In the aforementioned first Example, an image combining area is drawn on the handwriting input sheet, and an image combining instruction information list is created. After that, an image is selected on the index print, and the image combining area is selected on the handwriting input sheet having an image combining area drawn in advance. However, it is also possible to omit the processes of drawing an image combining area on the handwriting input sheet in advance and creating an image combining instruction information list.

FIG. 16 is a diagram showing the structure and outline of operation of an image combining system in the present Example. In the present Example, an index print and handwriting input sheet are created and an image is selected on the index print. At the same time, an image combining area is drawn on the handwriting input sheet, and the image and image combining area are associated based on the sequence of acquiring the handwriting information from the electronic pen 20.

FIG. 17 is a flow chart showing the overall processing of the image combining system in the present Example. In the first place, the image combining apparatus 10 creates the handwriting input sheet printed with a position detection pattern (S1100). The image data is captured (or image data storage location information is specified) from a digital camera, the image combining apparatus itself or a server. Then a step is taken to output the index print where a position detection pattern is combined with the background of the image based on the image data and/or image data identification information list (S1200). When the user employs the electronic pen 20 to select an image on the index print and draw an image combining area on the handwriting input sheet, the image combining apparatus 10 identifies an image from the handwriting information on the index print, and identifies an image combining area from the handwriting information on the handwriting input sheet. The image and image combining area are associated based on the sequence of acquiring the handwriting information or the like (S1300). After that, the image combining apparatus 10 combines the input image based on the image data selected for the image combining area or the image data storage location information (S1400), and outputs the combined image (S1500).

Of the aforementioned steps, the handwriting input sheet creation step in S1100, index print output step in S1200, image combining step in S1400 and combined image output step in S1500 are the same as the steps in S100, S400, S600, S700 of the first Example. Thus, the following describes only the process of association between the image and area in S1300.

[Association Between Image and Area in S1300]

In the first place, a user employs the electronic pen 20 to apply a prescribed handwriting operation to the identification information such as an image number described in the vicinity of the image on the index print, and selects an image. Then the control section 11 receives the handwriting information from the electronic pen 20 by wireless communication, infrared communication, wired communication or the like (S1301), references the association information stored in the data storage section 16 in advance, and then identifies the image corresponding to the position specified by handwriting information (S1302).

The user employs the electronic pen 20 to draw an image combining area on the handwriting input sheet. Then the control section 11 receives handwriting information from the electronic pen 20 by wireless communication, infrared communication, wired communication or the like (S1303), and identifies the image combining area based on the handwriting information (S1304).

The control section 11 ensures that the file names of the image specified and the thumb-nail image are displayed as required on the display/operation section 13 for confirmation by the user. After that, the control section 11 creates an image combining instruction information list for associating the specified image and the specified image combining area, and stores the same (S1305). After having received the next handwriting information from the electronic pen 20 (Yes in S1306), the control section 11 goes back to S1301 to repeat the same procedures.

In the present Example, after an image has been selected on the index print, an image combining area is drawn on the handwriting input sheet. However, an image can be selected on the index print after an image combining area has been drawn on the handwriting input sheet. Further, in the present Example, selection of an image and drawing of an area are performed alternately, and the image and area are associated. However, it is also possible to select plural images and then draw the same number of image combining areas. Then these images and areas can be associated. It is also possible to draw plural image combining areas and then select the same number of images to be associated.

FIG. 19 is a diagram describing the process of associating an image with an area. The images to be captured are the images having been obtained by a digital camera or the like. The index print has a position detection pattern printed on the background of the image so that the image to be used can be selected by the electronic pen 20. Further, identification information such as an image number is described in the vicinity of each image. To specify the image to be captured, handwriting operation is performed, for example, by using the electronic pen 20 to enclose the identification information or to draw an x-mark or the like on the identification information.

In the meantime, the handwriting input sheet is printed with only the position detection pattern (or a combined image made up of a combination of a position detection pattern and original image). A contour of a closed area is drawn on this handwriting input sheet as shown in FIG. 9.

By reference to the association information, an image is specified by the handwriting information on the index print, and the position of circumscribed rectangle of the closed area is calculated from the handwriting information on the handwriting input sheet. Then the image combining area is identified from the size and position (coordinates) of the rectangle, and the image selected on the index print and the image combining area drawn on the handwriting input sheet are associated, based on the sequence of acquiring the handwriting information. The resulting information is reflected in the image combining instruction information list.

As described above, when an image has been selected on the index print and an image combining area has been selected on the handwriting input sheet, the image and image combining area are associated based on the sequence of acquiring the handwriting information from the electronic pen 20. The combined image data made by combining the image or the image data storage location information as a source of that image with the image combining area is outputted. This control procedure ensures easy image combination on a prescribed position of a sheet or a screen.

The present invention is not restricted to the aforementioned Example. The structure or control of the present invention can be appropriately modified, without departing from the spirit of the invention.

The embodiment of the present invention is applicable to an image combining apparatus for combining images at a prescribed position on a sheet or screen, and a system provided with this image combining apparatus.

According to the image combining apparatus and image combining program in an embodiment of the present invention, easy image combination on a prescribed position of a sheet or a screen is provided.

This is because of the following structure: When the user has selected an image employing the first medium (e.g., index print) where a position detection pattern is formed on the background of the image list and has handwritten the combining area of the image using the second medium (e.g., handwriting input sheet) where the position detection pattern is combined, the image combining apparatus (image combining program) acquires from the electronic pen the position information for specifying the figures drawn on the first medium, and identifies the image from this position information by referencing the association information stored in advance. At the same time, the image combining apparatus acquires from the electronic pen the position information for specifying the figures drawn on the second medium, and identifies the combining area of the image from this position information. The image and combining area are associated based on the sequence of acquiring the position information. This arrangement provides the control of generating a combined image made up of an image combined with a combining area.

What is claimed is:

1. An image combining apparatus comprising:
a control section which acquires first position information based on a pattern on a first medium, the pattern disposed over a background of a list of images, the control section identifies an image from the list of images by using the first position information by referring to information for associating each of the images with a position on the first medium,
wherein the control section acquires second position information based on a pattern on a second medium, and the control section identifies an image combining area by using the second position information, and then associates the image combining area with the image, wherein the image combining area is at a prescribed position on the second medium;
an image processing section for creating a combined image, wherein the image is located at a position in the combined image that corresponds to the prescribed position of the image combining area on the second medium; and
an output section for outputting data of the combined image.

2. The image combining apparatus of claim 1,
wherein, if on the first medium there is a figure which designates image identification information arranged in a vicinity of each of the images, the control section identifies the image from the first position information.

3. The image combining apparatus of claim 1,
wherein, if on the second medium there is a contour figure of a closed area, the control section identifies the image combining area from the second position information.

4. The image combining apparatus of claim 1,
wherein, if on the second medium there is a specific image drawn inside a contour figure of a closed area drawn in advance, the control section identifies the image combining area from the second position information for identifying the contour figure of the closed area.

5. The image combining apparatus of claim 1,
wherein the control section alternately acquires the first position information and the second position information, and controls so as to associate the image identified by the first position information with the image combining area identified by the second position information, which is acquired immediately after acquiring the first position information.

6. The image combining apparatus of claim 1,
wherein the control section alternately acquires the first position information and the second position information, and controls so as to associate the image combining area identified by the second position information with the image identified by the first position information, which is acquired immediately after acquiring the second position information.

7. The image combining apparatus of claim 1,
wherein the first medium is an index print obtained by arranging and printing thumb-nail images of photographs.

8. A non-transitory computer-readable recording medium including an image combining program to be executed in an apparatus capable of communicating with an electronic pen, the program making the apparatus function as:
   a control section which acquires first position information based on a pattern on a first medium, the pattern disposed over a background of a list of images, the control section identifies an image from the list of images by using the first position information by referring to information for associating each of the images with a position on the first medium,
   wherein the control section acquires second position information based on a pattern on a second medium, and the control section identifies an image combining area by using the second position information, and then associates the image combining area with the image, wherein the image combining area is at a prescribed position on the second medium; and
   an image processing section for creating a combined image, wherein the image is located at a position in the combined image that corresponds to the prescribed position of the image combining area on the second medium.

9. The computer-readable recording medium of claim 8,
wherein, if on the first medium there is a figure which designates image identification information arranged in a vicinity of each of the images, the control section identifies the image from the first position information.

10. The computer-readable recording medium of claim 8,
wherein, if on the second medium there is a contour figure of a closed area, the control section identifies the image combining area from the second position information.

11. The computer-readable recording medium of claim 8,
wherein, if on the second medium there is a specific image drawn inside a contour figure of a closed area drawn in advance, the control section identifies the image combining area from the second position information for identifying the contour figure of the closed area.

12. The computer-readable recording medium of claim 8,
wherein the control section alternately acquires the first position information and the second position information, and controls so as to associate the image identified by the first position information with the image combining area identified by the second position information, which is acquired immediately after acquiring the first position information.

13. The computer-readable recording medium of claim 8,
wherein the control section alternately acquires the first position information and the second position information, and controls so as to associate the image combining area identified by the second position information with the image identified by the first position information, which is acquired immediately after acquiring the second position information.

14. The computer-readable recording medium of claim 8,
wherein the first medium is an index print obtained by arranging and printing thumb-nail images of photographs.

* * * * *